Figure 1:
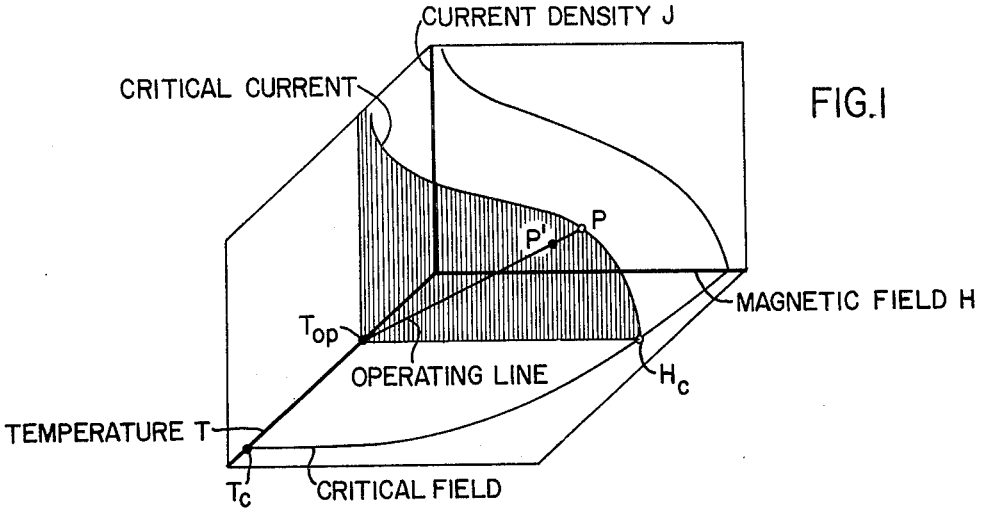
Figure 2:
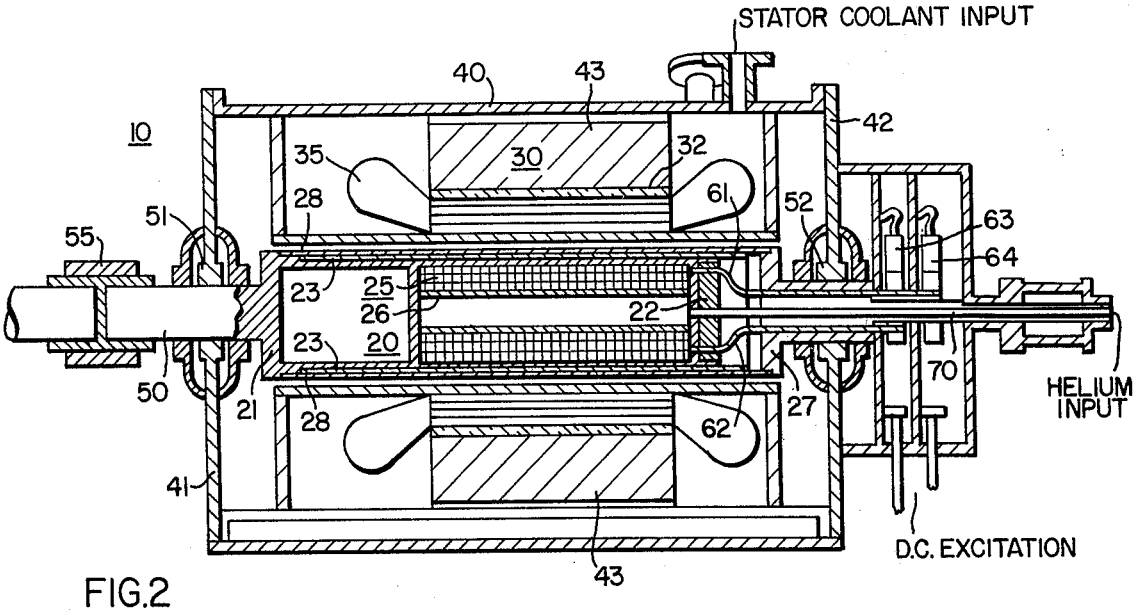
Figure 3:
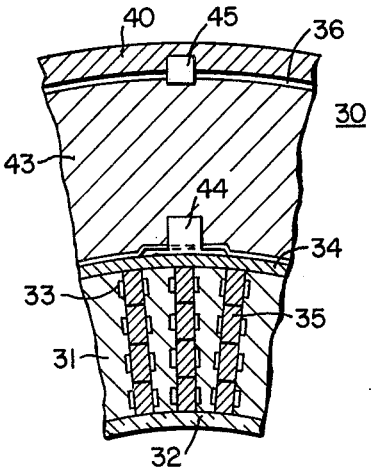

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED APRIL 6, 1976

945 O.G. 29

T945,002

SUPERCONDUCTIVE WINDING

Walter J. Carr, Jr., and Daniel W. Deis, Pittsburgh, Pa., assignors to Westinghouse Electric Corporation, Pittsburgh, Pa.

Filed Jan. 2, 1975, Ser. No. 538,289
**Int. Cl. H02k *9/00***
U.S. Cl. 310—40 R
2 Sheets Drawing. 13 Pages Specification

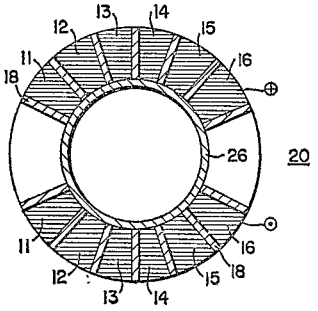

A superconductive field winding is provided for the rotor of a dynamoelectric machine. The winding consists of a number of multi-turn coils of a superconductive conductor which are wound about the periphery of the rotor thereby defining at least one pole pair. Selected coils of each pole pair are series-connected in groups of two coils or more and all of the series connected coil groups are connected in parallel one to another. Resistance elements connected in series with the parallel connected coils cause the current density of coil conductors disposed in regions of high field intensity to be reduced in relation to the current density of conductors lying in regions of low field intensity, thereby allowing the use of higher source current. A net increase in the useful external magnetic field is therefore obtained for a given amount of superconductive material.

FIG.4
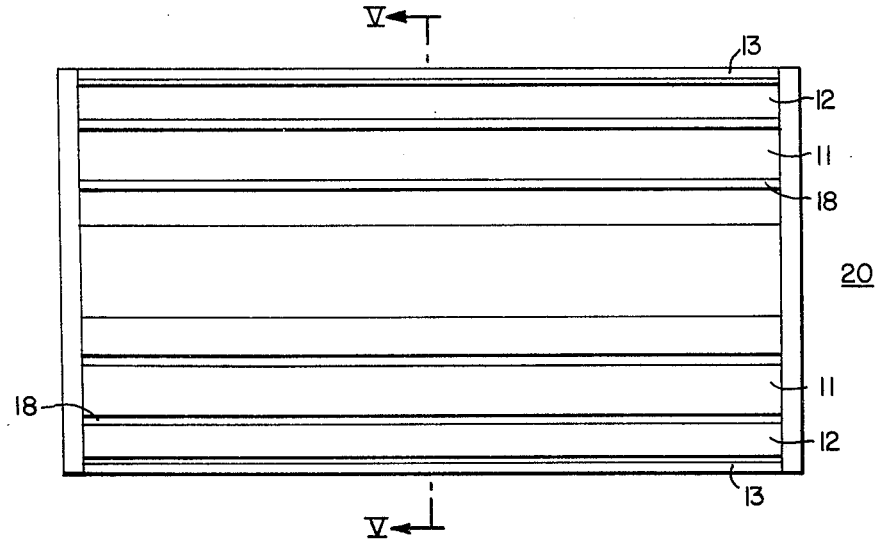
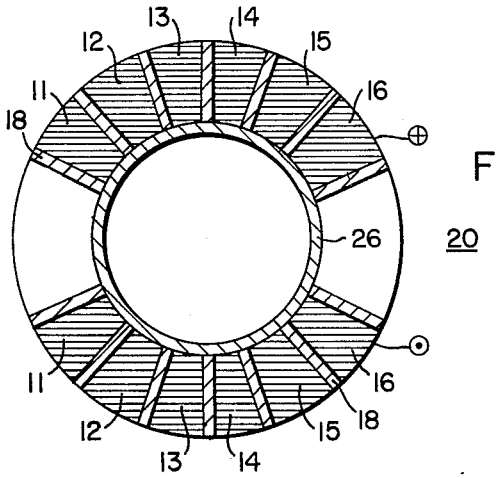
FIG.5
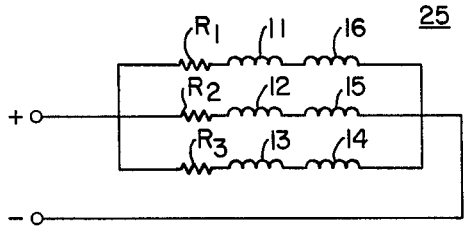
FIG.6
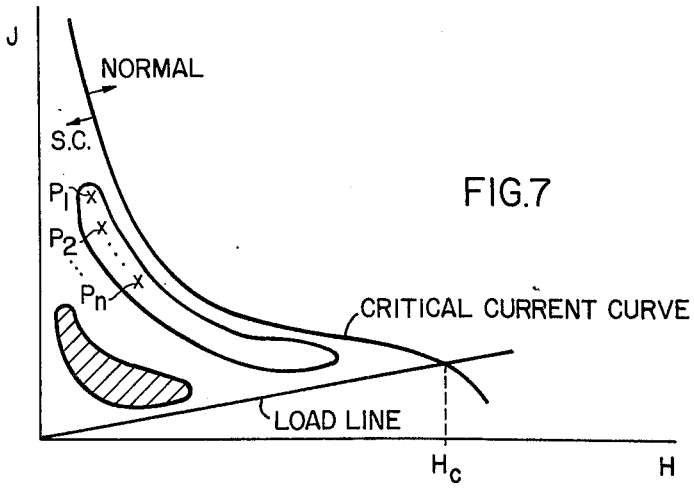
FIG.7